July 6, 1937. C. H. SCOTT 2,086,394
SEDIMENTATION APPARATUS
Filed July 26, 1935 9 Sheets-Sheet 1

INVENTOR
CHARLES H. SCOTT
BY
ATTORNEY.

July 6, 1937.   C. H. SCOTT   2,086,394
SEDIMENTATION APPARATUS
Filed July 26, 1935   9 Sheets-Sheet 2

FIG. 3

INVENTOR
CHARLES H. SCOTT
BY

ATTORNEY.

July 6, 1937.  C. H. SCOTT  2,086,394
SEDIMENTATION APPARATUS
Filed July 26, 1935  9 Sheets-Sheet 7

INVENTOR.
CHARLES H. SCOTT
BY
Arthur Middleton
ATTORNEY.

July 6, 1937.　　　C. H. SCOTT　　　2,086,394
SEDIMENTATION APPARATUS
Filed July 26, 1935　　　9 Sheets-Sheet 8

INVENTOR.
CHARLES H. SCOTT
BY
Arthur Middleton
ATTORNEY.

INVENTOR
CHARLES H. SCOTT
BY Arthur Middleton
ATTORNEY.

Patented July 6, 1937

2,086,394

UNITED STATES PATENT OFFICE 2,086,394

SEDIMENTATION APPARATUS

Charles H. Scott, Queens Village, N. Y., assignor to The Dorr Company, Inc., New York, N. Y., a corporation of Delaware Application July 26, 1935, Serial No. 33,209

5 Claims. (Cl. 210—55)

The present invention relates to sedimentation apparatus, and particularly to that type having a solids raking and collecting assemblage which is carried through the medium of an upstanding pier located within the basin of the apparatus, and which assemblage is operated through the medium of a stationarily mounted motor and reducing gearing between the rotor of the motor on the one hand and the assemblage on the other whereby, as the motor operates, the assemblage is caused to turn about a vertically extending axis, with the result that the solids raking and conveying elements of the assemblage move in closed paths about the pier and within the lower section of the sedimentation basin.

In sedimentation apparatus of the type referred to, the rotative movement of the solids raking and conveying assemblage is for the purpose of raking and collecting settled solids from diverse sections of the floor or bottom of the settling area over which the assemblage functions, and for effecting—by a ploughing or impelling action—a progressive transfer of the raked solids towards and into a solids discharge section corresponding thereto, usually to and into a collecting section or trench.

In such sedimentation apparatus, both the motor and the transmission gearing, as well as certain parts of the assemblage, derive support from the pier, and is frequently referred to as a center drive construction.

A center drive construction as shown in the Keefer et al. Patent 1,892,688, and the Scott Patent 1,888,743, is referred to as showing such, in contradistinction to an earlier type of construction typified by that shown in the Dorr Patent 1,356,608 and which is frequently referred to as the peripheral or traction type of drive.

Each type of construction referred to has certain advantages over the other. In general the commercial peripheral type of drive has been dependent for its operation upon the tractive friction existing between the driven traction wheel or wheels of the mechanism and a peripherally located rail upon and along which the operating mechanism travels as the motor thereof operates—and which motor it will be noted is located directly upon the traveling mechanism and moves therewith.

The center type of drive as developed has been of the positively-driven type, according to which the motor and certain of the gears driven thereby have been supported either stationarily or in stationary bearings, with the result that a positive movement can be and is imparted to the solids raking and collecting assemblage as it is driven, at a reduced speed, from the motor through the medium of the power transmission and speed reducing gearing.

Present day conditions have led to a demand, in certain instances, for sedimentation units of larger capacities than have heretofore been built. In certain instances there is employed a plurality of solids raking and conveying assemblages all located within a single sedimentation zone, and with such an arrangement a traction drive becomes impractical. Also, in certain instances, due to storm flow conditions or due to the enormous raking capacity required, it is preferable to have a positive center-drive type in contradistinction to the traction peripheral drive type of mechanism. Furthermore, in certain types of sedimentation units, as for example in the closed type of digester, it is desirable to use a center drive type rather than to attempt to use a peripheral drive mechanism, and all of these factors have led to the development of the center drive construction which is the subject of the present patent.

It is to be borne in mind, however, that where large solids raking and transferring capacities are desired for the raking and collecting assemblage, a relatively large load is imposed upon the main driving element which is directly connected therewith, to wit, to and upon what may be considered as the bull ring gear or ultimate main driven gear which has a direct driving connection between it on the one hand and the framework of the solids raking and collecting assemblage on the other hand.

While the motor employed for operating the mechanism is what may be considered of relatively small capacity, still, due to the enormous or relatively large degree of speed reduction which is attained by the employment of the speed reducing and power transmitting mechanism, there is finally encountered a relatively large amount of power which must be imposed through a relatively small gear to the final or ultimately driven bull ring gear. If an arrangement can be employed whereby the load upon this bull ring gear can be divided and transmitted thereto and simultaneously applied to two sections thereof, instead of to a single section, then the bull ring gear can be made correspondingly lighter, or at least substantially lighter than it would otherwise have to be made.

The present invention broadly contemplates the dividing of the power load required so that it is simultaneously imposed upon a plurality of sections of the driven main gear, to wit, the bull ring gear heretofore referred to, instead of applying the entire power load to and through a single section thereof.

While according to the broad concept of the invention, this division of load could be accomplished through the medium of a plurality of sets of motors and speed reducing gearing, in which the power from one motor and the associated speed reducing gearing is applied to one section of the main driven gear, and the power from the second motor and associated speed reducing gear is applied to a second section of the main gear, nevertheless according to the preferred embodiment of the invention it is preferable to employ a single motor arranged to transmit power through a speed reducing gearing and in such a manner that the speed reducing gearing in effect comprises two operative sections, one leading to a place of driving engagement with one portion of the main gear, and another leading to a driving engagement with another section of the main gear. Where the dividing of the speed reducing gearing is into two operative sections, the application of power transmitted load to the main gear is applied at opposite sections, to wit, part thereof at one side of the center and the other part to another or opposite side of the center of the main driven gear.

Where the entire load is imparted to a main driven gear at one point only, there is created a force acting in a peripheral direction and there exists a reactive force which must be absorbed by the main bearing for the gear and assemblage as a whole.

The dividing of the load transmitted to and through the main driven gear so that the thus transmitted load is applied to opposite sections of the main driven gear, substantially avoids unbalanced load conditions as applied thereto, and substantially avoids reactive effects which are imposed upon the main bearing where only single power transmitting mechanism is employed.

It is exceedingly difficult to construct a power transmitting and speed reducing mechanism so as to have divided power transmitting sections and in a manner such that a balancing application of power will be imposed upon the main gear through the divided sections, and an object of the present invention is to provide an arrangement according to which there will be realized and insured this balanced delivery of power and application of power through the divided operative sections of the power transmitting mechanism to the opposite sections of the main or driven gear.

In the construction shown this is accomplished by the employment of a power transmission gear element which may be described as of the floating type, or at least of the semi-floating type, which is herein referred to as an "equalizing" gear and which is associated with two gears driven thereby, the latter of which are herein referred to as the "equalizer driven gears" and are of similar type and function, one of which said driven gears is located in one of the operative power transmission sections, and one of which is located in a second power transmission section, of the speed reducing and power transmitting gearing. The last-mentioned gearing may be referred to by the broader name of speed reducing and power transmitting mechanism. As otherwise expressed, in the construction shown the desired balanced condition for split load or power transmission delivery is attained by mounting the equalizing gear in such a manner that it can bodily position and adapt itself to and according to the divided load requirements whereby, because of the equalizing and adjusting characteristics thereof incident to its ability to float bodily from any one operative position to successive compensating operative positions, like loads can be simultaneously transmitted from the equalizing gear to and through the different operative power transmitting sections of the speed reducing and power transmitting mechanism and thus to the main ultimately driven gear thereof whereby the power required for the turning of the solids raking and collecting assemblage is ultimately transmitted thereto.

The invention according to certain aspects or objects thereof may be viewed as directed to the dividing of the power operating load requisite and necessary for the operating, that is, for the effecting, of the turning movement of a rotatable solids raking and collecting assemblage, and to simultaneous applications of the divided load to a driven element but through the medium of which the rotatable solids raking and collecting assemblage is caused to turn or operate as the several sections of the divided power load are simultaneously applied to and for collectively operating said driven element.

The invention according to other aspects or objects thereof revolves about the imparting of a power operating load from the rotor of the motor to an ultimately driven gear constituting a driven element that is attached to or which constitutes a part of the rotating solids raking and collecting assemblage and which power operating load is transmitted from the rotor of the motor to the ultimately driven gear through gearing that comprises a plurality of like functioning power transmission means—provided as by like functioning gears or like functioning sets of gears—arranged so that through each of said means a part of the power load only is transmitted and that progressively to the tooth portion of the ultimately driven gear, but by each of said means from a different locality in respect to the ultimately driven gear, whereby due to the collective functioning of said like functioning power transmission means the total requisite power operating load is imparted to the ultimately driven gear, with the result that a driven gear of lighter construction can be employed as the ultimately driven gear, and also with the result that the power load applications to such ultimately driven gear are brought about in a manner more favorable to smooth and steady operation, and in a manner to avoid any substantial reactive effects thereupon which would otherwise have to be absorbed for the ultimately driven gear or for the centering bearing or shaft of the rotary solids raking and collecting assemblage and about the vertical axis of which said assemblage turns during the operation thereof.

In sedimentation apparatus of the type to which the present invention is applicable, the motor and the associated speed reducing and power transmission mechanism or gearing is at a location which is relatively accessible to an operator or attendant, or as otherwise expressed, the headquarters of the operator or attendant are normally quite distant therefrom, and as a practical necessity attention thereto is relatively infrequent. Since the motivating power transmission element employed in sedimentation units is in relatively exposed places and operating under relatively exposed conditions, it becomes important to provide a construction which will function indefinitely without experiencing difficulties because of inattention on the one hand, or because of abnormal or severe weather, temperature or operating conditions on the other hand. To that end movable parts of the apparatus as a whole and the power transmitting mechanism thereof have been designed so as not to be detrimentally affected under such abnormal or severe operating conditions, and as a part of that program the motivating mechanism, to wit, the motor, and speed reducing and power transmission mechanism which is necessarily installed between the motor on the one hand and the ultimately driven gear on the other hand and which constitutes a part of a turntable construction provided for the rotatable solids raking and collecting assemblage, has been made so as to provide a relatively closed and tight housing construction of a type to substantially keep out water, moisture, dirt or dust, and so as not to be detrimentally affected by changes in temperature or weather conditions, and of a type designed so that the several moving parts thereof, as for example transmission gears and bearings therefor, will be constantly self-lubricating for a relatively long and extended period, particularly as to such parts which constitute moving elements of the speed reducing and power transmission train or trains of gearing, and because of the necessity that they be in closed housings since they are not readily accessible to an attendant even though he be nearby.

It will hereafter appear that the structural arrangement of the apparatus herein disclosed satisfies these requirements, that each gear is arranged in the mechanism so that it is continuously lubricated from a bath of oil therefor, and which in the preferred form of construction is arranged so that each gear, including the two portions thereof as well as the bearing portion thereof, is located within and extends into the oil.

The objects of the invention are to provide arrangements whereby the novel features above referred to and herein disclosed may be advantageously employed in mechanism or apparatus of the type herein described. Further objects and advantages will become apparent from that which follows.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which

Fig. 9 is a sectional view taken as on the vertically extending plane indicated by the line 9—9 of Fig. 8 looking in the direction of the arrows.

Figs. 19 and 20 collectively illustrate the mechanism by which the overflow sections can be vertically positioned or adjusted and whereby they can be held in such adjusted position.

Reference will now be made to the drawings in detail. Therefrom, in connection with the description herein set forth, one will readily appreciate how the invention hereof is embodied in and is useful in the functioning of a sedimentation unit or apparatus as a whole.

The invention is herein illustrated and described in connection with a type of such unit or apparatus as has been particularly designed for use in the desilting of river water where enormous capacities have to be provided for, but it is pointed out that the invention hereof has a broad field of application. Moreover, insofar as the principles and features underlying the invention are involved, it is immaterial, according to the broad aspect thereof, whether the invention is applied to a sedimentation unit having several neighboring solids collecting assemblages operating in a single basin, as illustrated herein, or whether the invention is applied to a unit or apparatus having a single set of solids collecting assemblages in a single basin, as for example, of the type and arrangement shown in the Keefer et al. Patent 1,892,688 granted January 3, 1933 entitled "Sewage treating apparatus" or the Scott Patent 1,888,743 granted November 22, 1932 entitled "Sedimentation apparatus".

The sedimentation basin of the type shown, the arrangement of a multiplicity of neighboring sets of solids raking and collecting assemblages in a single basin and the novel characteristics, features and arrangements thereof, incident to or embraced in a general arrangement employing the parts of features mentioned, constitute the basis of an invention of Harold B. Coulter entitled "Sedimentation apparatus" for which an application for Letters Patent bearing Serial No. 31,123 was filed on July 12, 1935.

The sedimentation basin, the arrangement of the solids raking and collecting assemblage, the employment of a hollow pier or column having a chamber open at the top and a discharge conduit leading from the lower interior portion thereof and upon which hollow column the solids raking and collecting assemblage is rotatably mounted, and the employment of an overflow conduit construction leading from the lower interior portion of the basin and having a vertically adjustable or vertically positionable overflow section which is provided and arranged for delivering solids-liquid mixture passing thereto as underflow from the lower interior portion of the basin to and into the chamber within the pier or column—constitute novel features and arrangements of an invention of Wayne A. Kivell for which an application for Letters Patent entitled "Sedimentation apparatus" and bearing Serial No. 31,139 was filed July 13, 1935.

The arrangement and assemblage of the features just referred to is shown in the drawings in Figs. 1, 1A, 2, 2A and 3 of not only this application, but also in the Coulter and Kivell applications referred to, and for the purpose of completeness each of said applications, including this application, contains a description of said figures.

Therefrom it will be noted that the sedimentation unit embodies a sedimentation channel, trough or basin collectively designated at 1. In the construction shown it has been formed and largely defined by the excavating of land to provide the sedimentation zone of the basin, and three portions of the boundary wall of the basin are provided by mounds or water retaining sections of earth left or formed as the result of the excavating operations. A fourth portion of the boundary wall of the sedimentation basin is provided by a concrete influent channel construction. The concrete influent channel construction just referred to is designated by 2. It has upstanding side or wall portions 3—3, and openings 4. The side walls 3—3 are arranged so that according to the horizontal view there is provided a progressively tapering influent channel 5 which in cross section gradually decreases in passing towards the forward or foremost discharge section thereof. The construction of this influent channel may be described as providing influent openings which are arranged at and along one side or end portion of the sedimentation basin. A weir construction is provided at and along the opposite side or end portion of the sedimentation basin, to wit, by an extended mound or retaining section of earth 6 which is capped by a concrete construction at 7, and thus provides the weir which is slightly below the normal operating level of the sedimentation basin as indicated by the line 8 whereby—as the result of a continuous inflow, through the openings 4, of influent or water to be subjected to sedimentation, that is, to a desilting operation—there can follow a continuous overflow as relatively clarified or desilted effluent, of the supernatant of the sedimenting or desilting operation that is carried out within the sedimentation zone of the sedimentation trough or basin. The overflow past the weir is into a main effluent conduit or trough 9 which is in part defined by the mound or retaining section 6 heretofore referred to, and by a higher mound or retaining section 10. The other marginal or boundary wall portions of the sedimentation basin are provided by extended mound sections as 11 and 12, the top of which it will be apparent should extend substantially above the normal general level of the liquid as indicated by 8.

The concrete influent channel construction 2 extends to and within a main supply channel 13, the details of which it is not necessary to describe in connection with the present invention. It will be manifest, however, that provision should be made for interrupting the flow, as desired, from the channel 13 to and into the influent section 2, and to that end a valve or gate may be incorporated as at 14.

Figures 1, 1A, 2, 2A:
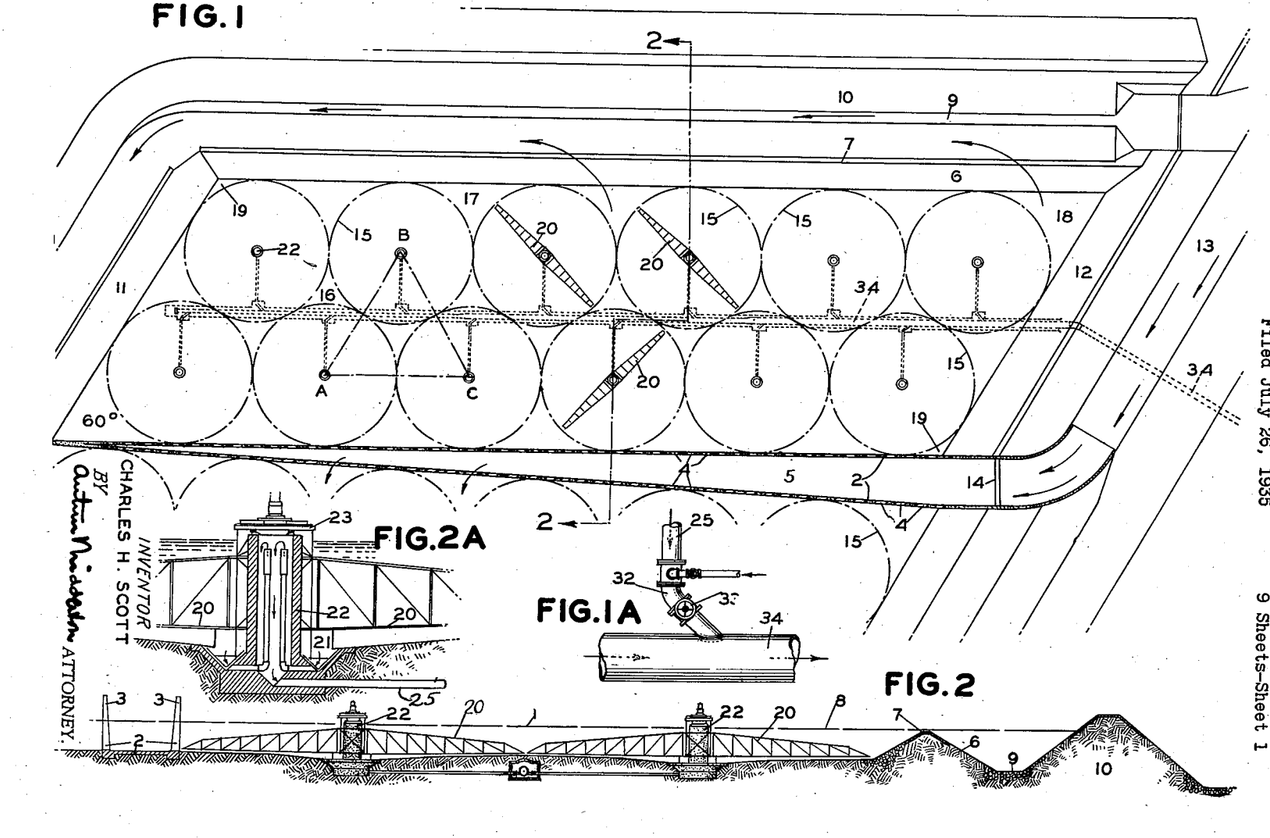
Fig. 1 is a plan view of a sedimentation unit particularly designed and constructed for use in the desilting of river water.
Fig. 1A shows a detail employed in the construction of Fig. 1 but on a somewhat larger scale than appears in Fig. 1.
Fig. 2 is a vertical view taken as on the plan indicated by the broken line 2—2 of Fig. 1, looking in the direction of the arrows.
Fig. 2A is a vertical sectional view on a somewhat larger scale than Fig. 2 of a constructional detail and arrangement employed in Fig. 2.

The sedimentation basin 1 may be considered as having or as comprising neighboring or nested sections indicated, for example, by the long and short heavy dash circles 15 in Fig. 1. In effect, these circles or the portions defined thereby may be considered as arranged in two rows, in each of which rows is provided a series of juxtaposed sections in which adjacent floor portions or bottom sections defined by circles 15 are tangent to each other. The two rows or longitudinally arranged series of circular portions may be considered as transversely spaced and the two rows of circular portions are arranged in respect to each other in such a manner that any one circular portion contacts or is tangent to two other circular portions adjacent thereto whereby, in respect to any three circular portions of which each circular portion merges into the other two circular portions, there results a triangular arrangement of which the center of each circular portions is at the vertex of an acute angle of an equilateral triangle, as A—B—C, which is formed by lines connecting the centers. The retaining mound or sections 11 and 12 in fact practically parallel certain lines connecting these centers or, as otherwise expressed, have an inclination of 60° in respect to the influent channel side walls 3. Or as otherwise expressed, the flow from the influent channel 2 across the sedimentation basin and ultimately over the weir 6 thereof is in a general direction which is at 60° in respect to the influent channel.

The floor or bottom sections defined by the circles 15 may be viewed as slightly dished or depressed because there is a gradual and gentle downward slope in passing from the edge of the circular portion 15 towards the center thereof. This slope is manifest from an inspection of Fig. 2 and it is to be noted that the floor or bottom of the sedimentation basin is left relatively free and unobstructed without any substantial upward projections or cross walls between the several sections indicated by the circles 15.

In the construction shown there are left what may be considered as "islands" as 16, 17, 18 and 19, but in connection with a desilting plant the sediment which will deposit upon these islands should not be found objectionable.

The floors as defined by the several sections 15 gradually merge from one into the other whereby any substantial upward projection is avoided and each section is served or provided with a solids-raking and collecting mechanism 20, frequently referred to as a solids-scraping and collecting assemblage, that is provided for raking settled solids deposited upon and within the sections 15, and for conveying solids collected thereby to and within a depressed floor section or sump 21 which is sometimes herein referred to as a solids-receiving trough, and which may also be properly referred to as a solids-collecting trough. This trough is clearly indicated in Fig. 2A and Fig. 3.

Figure 3:
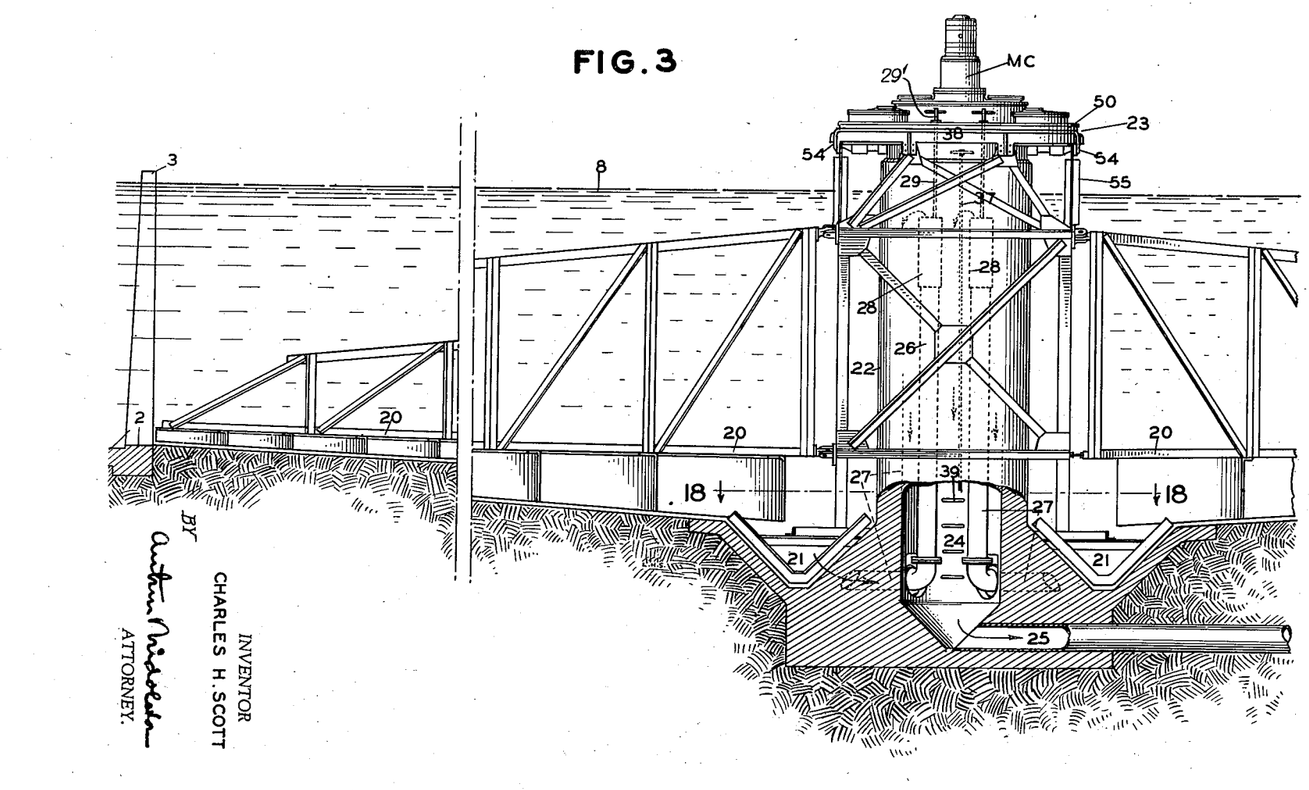
Fig. 3 is a partial elevational view, on a still larger scale than Fig. 2, and therein certain portions thereof are shown in vertical cross section.

Each section 15 has a stationary hollow upstanding pier or column 22, at the base of and around which said collecting trough is arranged as clearly shown in Figs. 2A and 3. This hollow column 22 extends above the general liquid level as at 8 and is capped by any suitable frame member as 23 which serves as a part of the mechanism, by and through the medium of which the solids-raking and conveying assemblage is rotatably mounted on and carried by said pier or column.

The details of the particular mechanism by which the solids raking and collecting assemblage is carried and operated is, as previously indicated, an essential part of the present invention, and the detailed description thereof will follow in a later portion of this specification.

The pier or column 22 provides a chamber 24 which is open and accessible from the top but which is relatively closed at the bottom except for a conduit as 25 leading therefrom, the purpose of which will subsequently appear.

Figures 18, 19, 20:
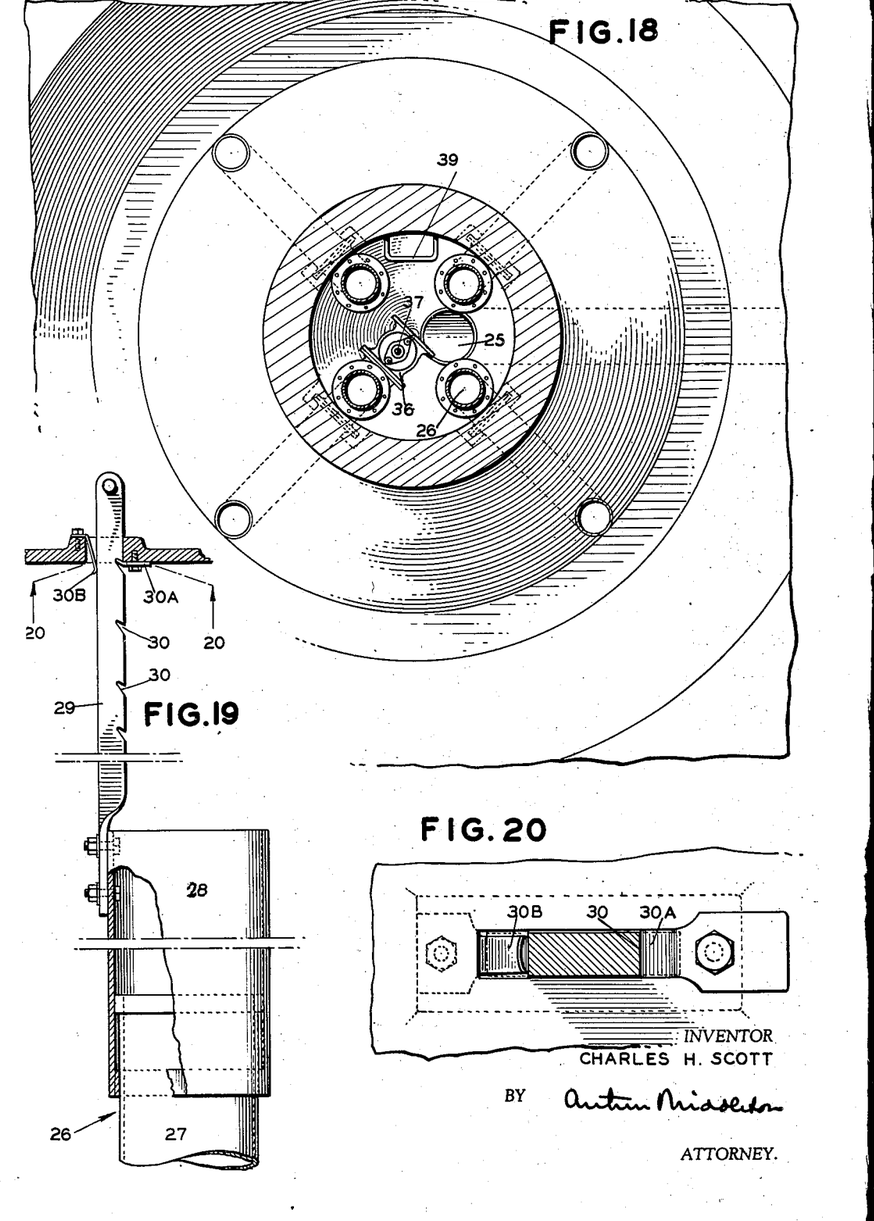
Fig. 18 is a sectional view taken as on the horizontal plane indicated by the broken lines 18—18 of Fig. 3. It is to be noted, however, that none of the solids raking and collecting mechanism shown in this Fig. 3 appears in Fig. 18.
Fig. 19 is a detail view illustrating vertically positionable overflow sections of the overflow conduit construction which is illustrated more clearly in its assembled relationship in Fig. 3.
Fig. 20 is a view taken as on the plane indicated by the broken lines 20—20 of Fig. 19 looking upwardly in the direction of the arrows.

A construction herein referred to as an overflow pipe or conduit construction is broadly designated by 26, and it comprises pipe or conduit sections 27 which lead from the solids-receiving or collecting trough 21 to, into and upwardly within the chamber 24. At the upper section of this pipe or conduit construction 26 there are provided vertically positionable or vertically adjustable pipe or sleeve-like elements 28 which are relied upon for determining the vertical elevation of an overflow section of said overflow pipe construction. This section, by being vertically positionable or adjustable, can be relied upon and is relied upon to regulate to a certain extent the type of outflow from the trough or sump 21 or, in other words, to regulate or adjust the degree of solids concentration which will necessarily take place as the sedimentation unit operates in a continuous manner. The vertically positioning or adjusting of the overflow sections 28 can be accomplished in any suitable manner, and in the construction shown is accomplished by the vertically moving of the section 28 by and through the medium of a rod 29 and screw adjusting means 29' or as by suitable adjusting means as provided by notched sections 30, retaining hooks 30A and spring 30B—see Figs. 19 and 20.

There is sometimes desired the emptying of the entire content of the sedimentation basin, and to this end a stop valve or gate 36 (see Fig. 18) is provided in a part of the conduit construction that leads from the lowermost portion of the sedimentation basin.

The chamber 24 into which the liquid-solids mixture flows from the receiving trough 21 past the overflow, is sometimes called a silt-receiving chamber. The overflow has been made vertically adjustable or, in other words, vertically positionable in order to determine, adjust or control the degree of solids concentration in the liquid-solids mixture which thus passes from the overflow to and into said chamber. This vertical adjustment of the overflow is effected by the vertically positioning of the part or parts 28.

From the chamber 24 the liquid-solids mixture flows through the conduit section 25, past the section 32, past the valve 33 therein, to and into a main silt-discharge conduit 34, as will be manifest from an inspection of Figs. 1, 1A, and 3. In this manner the liquid-solids mixture obtained from the bottom of the sedimentation basin may be discharged exteriorly of the system to a point away from the effluent which passes the sedimentation basin over the weir 7.

In the arrangement shown one sedimentation unit has been installed along one side portion of the influent channel 2. It will be manifest that a similar type of sedimentation unit can be installed along the opposite side portion of the same influent channel, and in this way a sedimentation or desilting unit of large capacity can be realized.

It may be advisable or necessary to effect a direct draining of the sedimentation basin, and to that end one of the overflow conduit constructions or some other pipe leading from the lowermost interior portion of the sedimentation zone is provided with a stop valve 36 which is normally closed but which when open allows a direct draining of the sedimentation basin. The valve 36 may be operated as through the valve stem extension 37 thereof and a suitably located hand wheel (not shown). It is to be noted that this stop valve 36 is considerably below the general elevation of the delivery section as determined by the overflow sections 28.

It is to be noted that the overflow sections 28 are well above the lowermost defines of the sedimentation basin, and in the particular type of apparatus shown they are located only a relatively short distance below the general operating level 8 of the liquid within the sedimentation basin. The higher the elevation of the overflow sections 28, the greater will be the degree of solids concentration in the liquid-solids mixture passing outwardly thereover.

The chamber 24 has heretofore been described as one which is accessible from the top, and for the purpose of inspection, repair or the like it is provided with members 39 which in effect constitute the steps or rounds of a ladder extending for the full depth of the chamber.

It has heretofore been pointed out that the solids raking and collecting assemblage is provided so that, incident to the rotation thereof, settled solids are raked and impelled and thereby transferred to and into the solids collecting and receiving troughs 21, which are herein referred to as solids collecting and receiving sections that are located at the bottom of the sedimentation basin.

Figure 4:
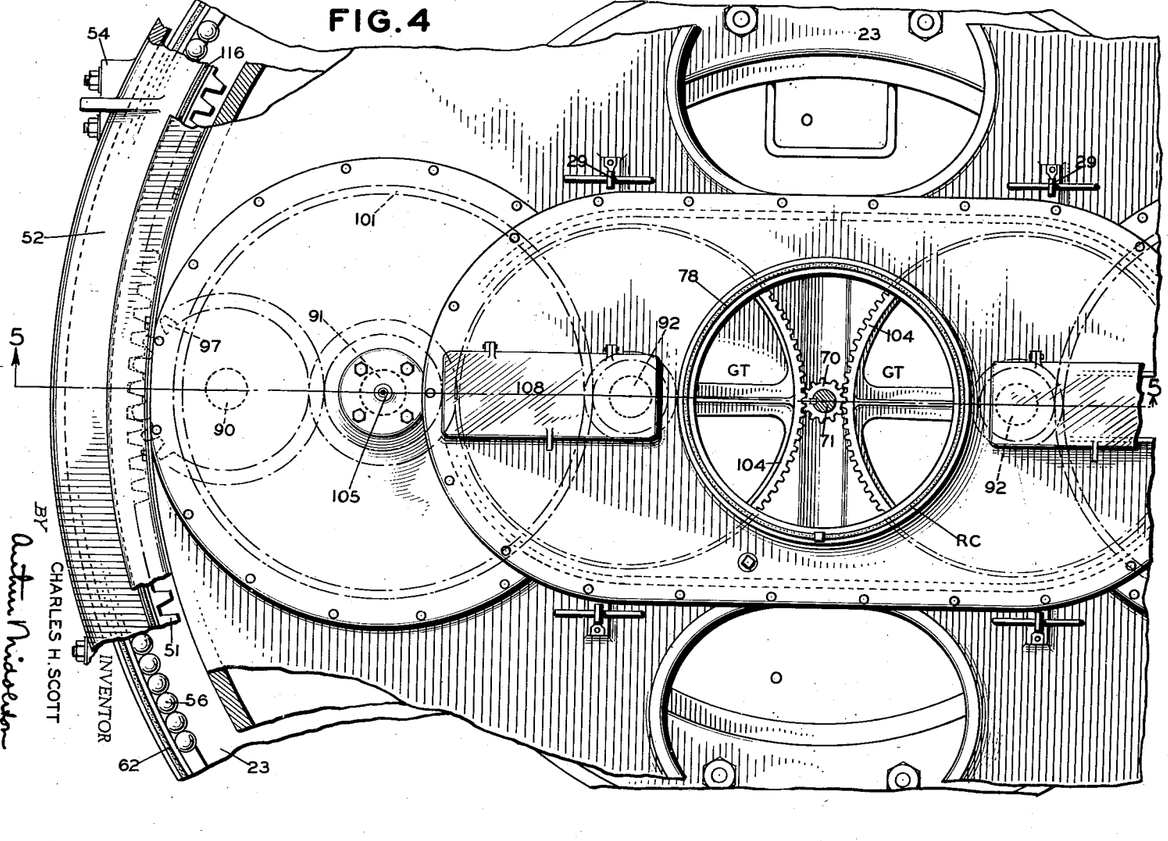
Fig. 4 is a plan view in which parts are broken away, with some shown in section, illustrating the mode of transmitting power from a motivating mechanism to a driven internal gear from which the solids raking and collecting assemblage is supported and by which said assemblage is driven.

It has also been pointed out that said solids raking and collecting assemblage is mounted upon the pier or column corresponding thereto through and by means of a turntable construction. This turntable construction comprises a stationary main frame member or body section 23 which is directly secured in place to and upon the top portion of the stationary hollow column or pier and, as will hereinafter appear, the construction is such that passageways or openings are provided in this stationary frame member or base whereby an attendant can pass into and from the chamber provided within the pier. Such access openings are indicated by O in the plan views Figs. 4 and 14, and in the sectional views 12 and 13. The turntable construction also comprises a rotatable driven element or member 50 which is in fact provided by a construction that includes an internal annular gear section 51, a surrounding section 52 that extends outwardly from the gear section, and a skirt section 53 which depends from the outer extremity of the outwardly extending surrounding section 52.

The rotatable turntable element 50 has ear portions 54 that serve as connections by which the frame structure 55 of the solids raking and collecting assemblage is supported and carried.

It will therefore be noted that the main driven turntable element 50 turns, as it is driven, about a vertically extending axis and thereby effects a turning about the same axis of the solids raking and collecting assemblage.

The rotatable turntable element 50 is supported and guided through the medium of an anti-friction bearing construction. The raceways for the anti-friction members 56 are provided on the main frame or body section 23 by the annular grooved or recessed portion 57 which is defined by the circular wall section 58 constituting a raceway and the horizontal circular section 59 constituting a raceway. This grooved portion 57 may be defined as located within the peripheral confines of the main frame or body section 23 and also as being located so that the raceway section thereof is substantially below the upper edge of said peripheral portion.

The driven member 50 provides the supported and guided race-way sections 60 and 61.

The raceway 59 on the main member is sometimes herein referred to as the supporting raceway, while the raceway 58 is sometimes referred to as the guiding raceway, both of which are located on the main frame or body section 23.

The raceway section 60 on the movable member 50 is sometimes referred to as a supported portion and sometimes as a supporting portion of the main driven rotatable member 50, while the raceway portion 61 is sometimes referred to as the guided and sometimes as the guiding portion of the main driven rotatable member 50.

At this junction it will be noted that the outwardly extending section 52 and the depending skirt portion 53 constitute a roof over the bearing construction just described whereby the same is protected from the weather.

As a means of preventing dust and undue moisture from creeping into the system, a felt packing is provided at 62. This packing will also serve to prevent any splashing of the grease outwardly past the bearing structure.

Figures 5, 6, 7:
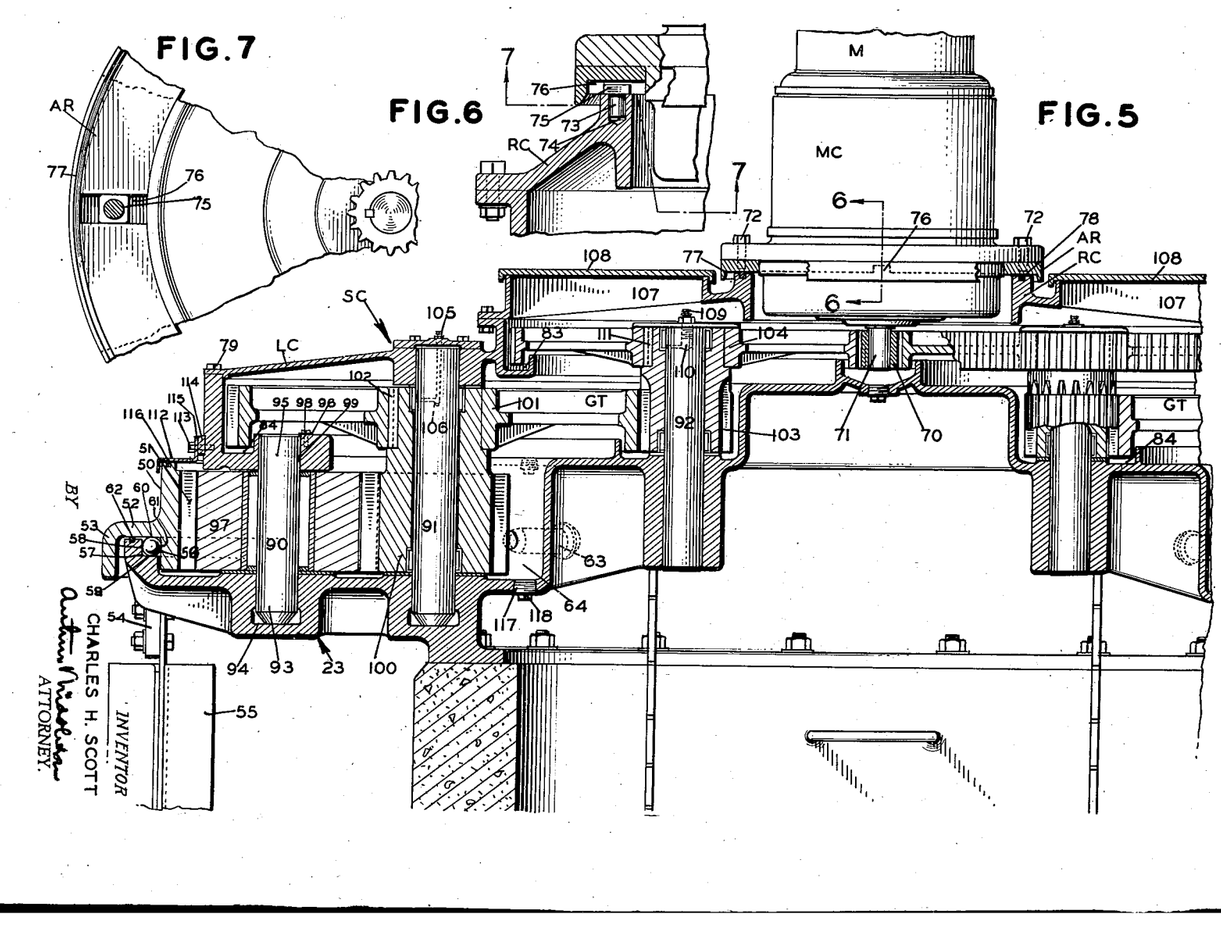
Fig. 5 is a vertical sectional view taken as on the plane indicated by the broken line 5—5 of Fig. 4 looking in the direction of the arrows.
Fig. 6 is a detail illustrating an adapter arrangement by which a housing for the motivating mechanism is carried by and from another main frame structure shown in Figs. 4 and 5, Fig. 6 being a sectional view taken as on the plane indicated by the broken line 6—6 of Fig. 5 looking in the direction of the arrows.
Fig. 7 is a sectional view further illustrating the adapter construction, and is a view taken as on the plane indicated by the broken lines 7—7 of Fig. 6 looking upwardly in the direction of the arrows.
Figure 10:
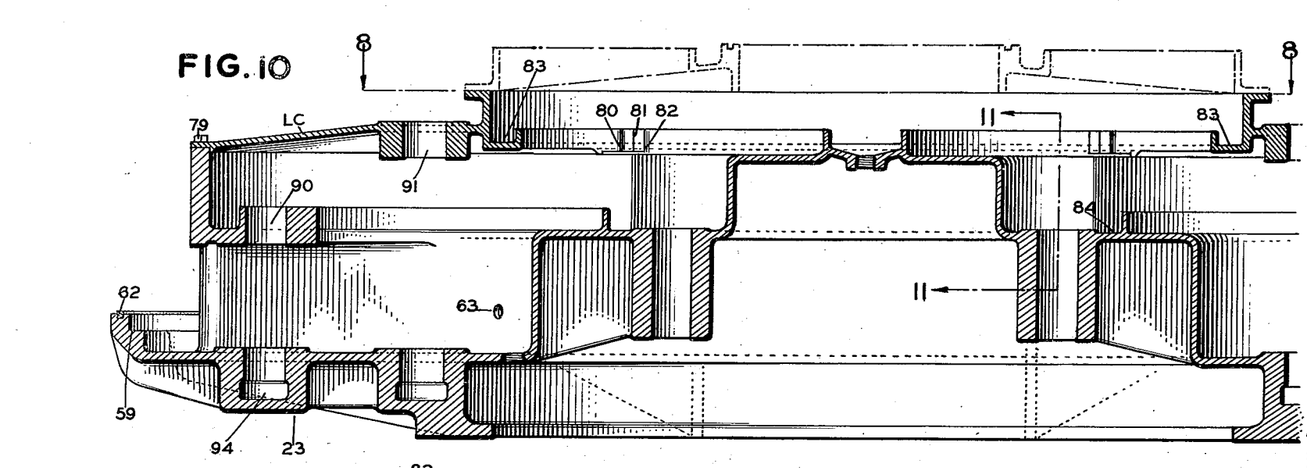
Fig. 10 is a vertical sectional view taken as on the plane indicated by the line 10—10 of Fig. 8 looking in the direction of the arrows.
Figure 11:
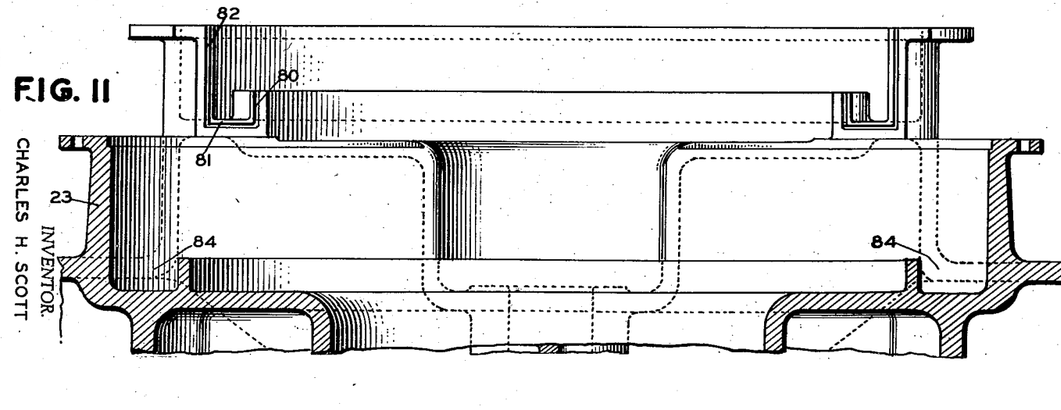
Fig. 11 is a vertical sectional view taken as on the plane indicated by the broken line 11—11 of Figs. 10 and 14. The removable cover shown in Fig. 10 has not been included, however, in Fig. 11.
Figure 12:
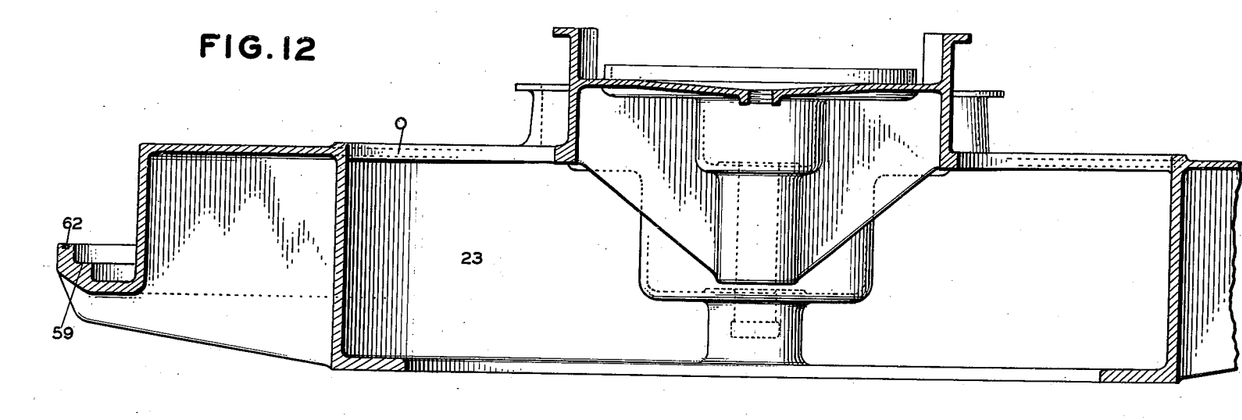
Fig. 12 is a vertical transverse sectional view taken on the plane indicated by the broken line 12—12 of Fig. 14 looking in the direction of the arrows.
Figure 13:
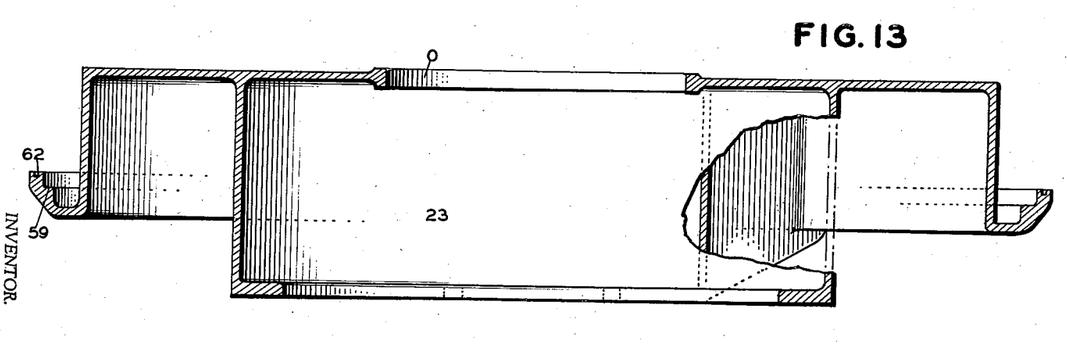
Fig. 13 is a vertical sectional view taken as on the plane indicated by the broken lines 13—13 of Fig. 14 looking in the direction of the arrows.
Figure 14:
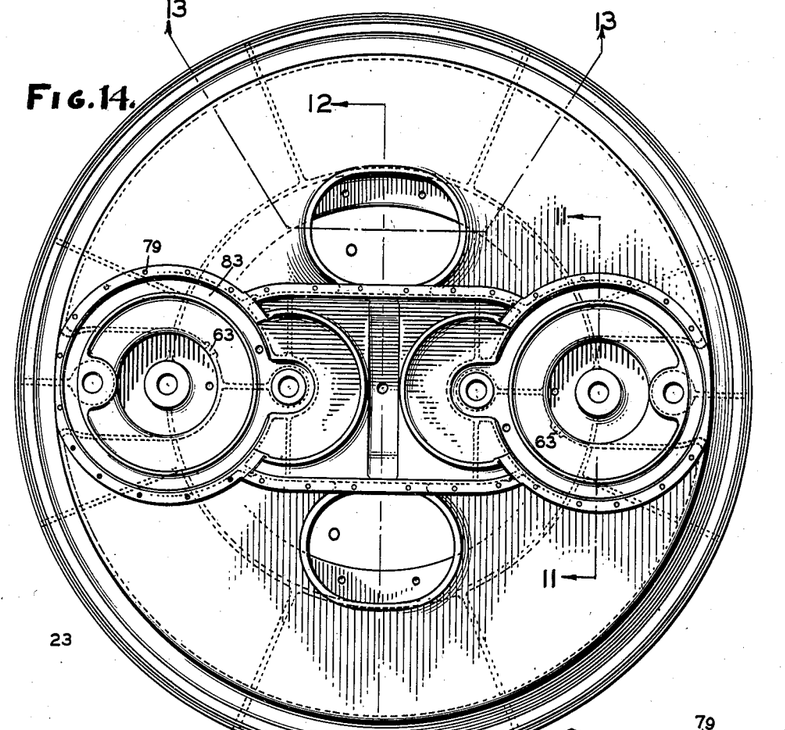
Fig. 14 is a plan view of the entire stationary main frame casting or body section of the turntable construction. In this figure only the main frame member is shown.

An oil overflow arrangement is indicated at 63, Fig. 5, Fig. 10 and Fig. 14.

The main frame or body section 23 is constructed so that it provides what may be considered as a main oil pocket 64 within the lower interior portion thereof, the top of which oil pocket is defined by the overflow 63 just referred to since, incident to the overflow construction, any oil tending to rise above the level of the overflow will be automatically withdrawn as long as said overflow is left open.

The stationary frame member or body section 23 may be viewed as the main member of a stationary turntable structure or casing which may be collectively referred to as SC. On this stationary casing there is mounted another housing or casing which is collectively designated MC and within which there is carried the rotor of an electric motor M and the movable elements of a speed reducing and power transmission mechanism or what may be referred to as a high-speed light-duty speed reducing and power transmission mechanism.

The motor and this high-speed light-duty speed reducing and power transmission mechanism are not shown nor described because apparatus embodying these features is old and well-known in the art, except that there is shown and described the last mechanical element of said high-speed power transmission mechanism provided by a pinion or gear element 70 that is located at the lower end of a vertically extending shaft 71. This gear pinion 70 may be viewed as a floating gear element which is driven in any suitable manner by and from the rotor of the motor M. It is referred to as a floating gear because of the fact that the housing MC is mounted through the medium of an adapter ring AR which may be viewed either as a part of the casing MC because of being secured thereto by means of the bolts 72, or as an intermediate member interposed between the housing MC and a stationary portion of the casing SC, to wit, to a removable cover portion thereof designated as RC.

The motor is broadly a motivating means, and the high-speed light-duty speed reducing and power transmission that includes as the last mechanical element thereof the pinion or gear element 70 may be viewed as a motivated mechanism of which the pinion or gear 70 is a motivated element. This pinion or gear 70 is sometimes referred to herein as being a horizontally movable and automatically positionable gear because it is mounted so as to horizontally float even while the gear train of which it constitutes a part is restrained against horizontal rotative movement. The gear 70 is sometimes referred to as a load equalizing gear and when supported as herein specifically shown it is properly describable as a vacillating or vacillatable gear since the mounting therefor permits the gear 70 to reel, stagger or horizontally waver in order that it may find its proper operative position and automatically locate itself in a self-finding position whereby it can serve to substantially and effectively equally divide the power load and to transmit the power load as divided thereby to and through the respective power transmission gear trains and thereby ultimately to the driven rotatable element or gear member 50 which is in fact the annular gear that is frequently referred to as the bull gear.

The adapter ring rests upon the removable cover RC so that it is free to slide horizontally thereupon, with the exception that it is restrained against rotative movement through the medium of a holding pin 73, the shank portion 74 of which extends into the removable cover section RC, and the head portion 75 of which enters the radial slotted portion 76 of the adapter ring AR. These details of construction are clearly brought out in Figs. 5, 6, and 7.

The adapter ring has a depending peripheral section at 77 and this, in conjunction with the felt packing at 78, insures a weather-tight arrangement as between the housing structure MC on the one hand and the removable cover RC on the other.

Figures 8, 9:
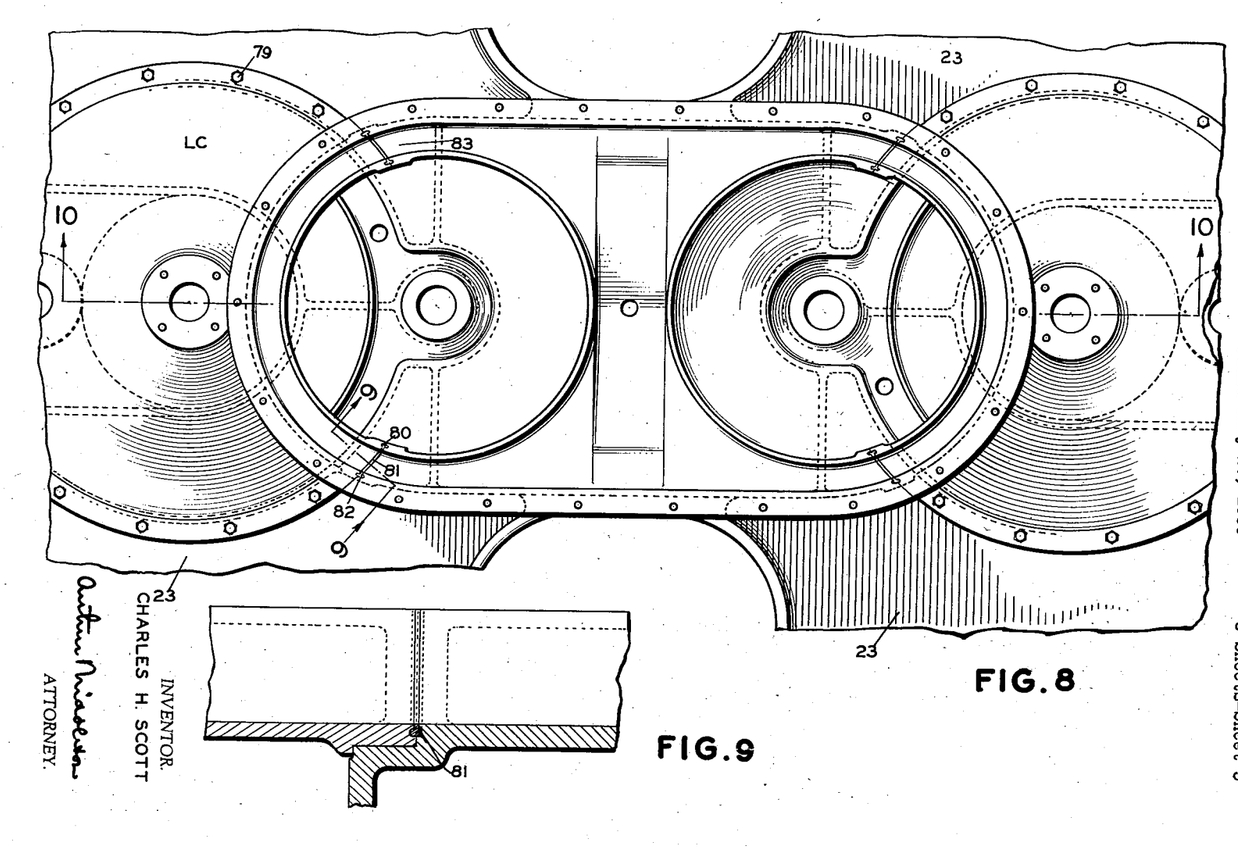
Fig. 8 may be considered as a view of the structure shown in Fig. 10 when taken as on the line indicated by 8—8 of Fig. 10 looking downwardly in the direction of the arrows. In this Fig. 8 there are included with the main casting the removable or replaceable cover plates which are indicated in Fig. 10, and further illustrated in Figs. 15, 16, and 17.
Fig. 9 is a detail at a somewhat larger scale than shown in Fig. 8 illustrating how the cover plate of Figs. 15 to 17 is brought into abutting engagement with the main frame casting. This
Figure 15:
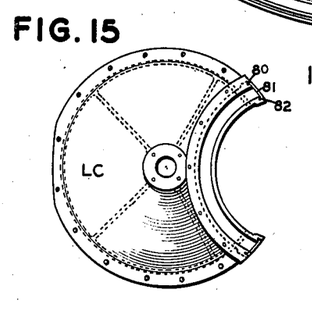
Figs. 15, 16 and 17 respectively constitute a plan, a side elevation, and a partial perspective view of a section of the removable or replaceable cover member associated with or providing a part of the stationary portion of the turntable construction.
Figure 16:
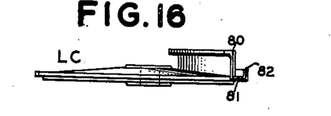
Figure 17:
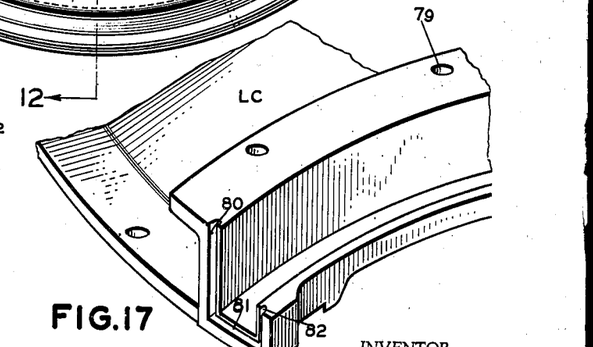

The stationary casing embodies not only the stationary main frame member or body section 23 which is illustrated in considerable detail in figures such as 8, 9, 10, 11, 12 and 13, but it also embodies two lower gear covers LC as shown in detail in Figs. 15, 16, and 17. When in place these lower gear covers are securely positioned so as to in effect provide a relatively permanent structure through the medium of bolts 79, and at this time it is pointed out that a suitable packing is applied within the grooved sections 80, 81 and 82 (see Figs. 8, 9, 11, 15, 16, and 17) whereby when in place this removable section, together with a corresponding section of the main frame member 23, will provide an oil receiving groove or pocket broadly designated 83. The location of this pocket is readily apparent from an inspection of Figs. 5, 8, and 10, and therefrom it will be manifest that it is in effect a double oil pocket, one section of which extends in one direction and another section of which extends in an opposite direction, and is thus constructed in order to take care of the lubrication of similarly functioning gears 104 hereinafter referred to. The oil pocket 83 may be referred to as the upper oil holding pocket.

Two other oil pockets or receiving spaces 84 are provided in and by the structure of the main frame member 23. The position of the oil pockets 84 is readily apparent from an inspection of Figs. 5, 10, and 11. These oil pockets 84 may be referred to as the intermediate oil pockets.

It will be manifest from what has preceded that the stationary turntable casing SC is constructed so as to embody three sets of oil pockets, to wit, a lower main oil pocket 64, an intermediate oil pocket or set of oil pockets 84, and an upper oil pocket or set of oil pockets 83.

Between the motor driven gear or pinion, the floating gear element 70, and the ultimately driven main turntable element 50, and more particularly the ultimately driven internal annular gear section 51 thereof, there is employed a plurality of trains of speed reducing and power transmission gearings, each collectively designated GT, each of which trains is herein referred to as a slow-moving heavy-duty speed reducing and power transmission mechanism and of which the several gears or pinions entering into its construction are constantly self-oiling or self-lubricating, because of their dipping into these pockets during the operation thereof. In other words, the arrangement is such that self-lubricating, incident to the operation, is essentially assured.

While the motor M may be only a relatively small motor, for instance a five-horsepower motor, nevertheless due to the tremendous speed reduction between the rotor thereof on the one hand and the ultimately driven gear element on the other, there is necessarily imparted to the ultimately driven gear a relatively large power load. This is essential because the ultimately driven gear must in turn impart rotary movement to the solids raking and collecting mechanism, the arms of which are relatively long and cover a relatively large solids raking area. It therefore becomes advisable to divide the power load transmitted to the ultimately driven gear so that part of the power load is applied thereto at one section thereof, and so that the rest of the power load is symmetrically applied to the ultimately driven gear 50 at other sections thereof, to wit, to a symmetrically arranged section as at a section at the opposite side of the center of the gear. In this way the ultimately driven gear can be made lighter by the employment of a plurality of sets of gear trains GT between the pinion gear 70 on the one hand and the ultimately driven gear 50 on the other. It is important, however, in the defining and arrangement of such multiple set of power transmission gearings that provision be made whereby each gear train will receive the same proportion of the load from the gear 70, and will transmit its proportion—and only its proportion—of the load to the ultimately driven gear whereby the driving of the ultimately driven gear will be through the conjoint effect of equally divided loads through the plurality of light-functioning and light-constructed trains GT of power transmission gearing, and to that end the gear 70 has been mounted so that it can float relative to the gears 104 which it drives, whereby it can assume equal load-imparting conditions in respect to each of the gears directly engaged and driven thereby.

The housing MC for the mechanism carrying the pinion or gear 70 is constructed and mounted by and through the medium of the adapter ring AR and the pin 75 which engages the slotted portion 76 of the adapter ring in a manner that prevents the turning of the housing MC, thus insuring the transmission of the power load to the gears driven by the pinion 70 as the latter turns, but which permits that requisite floating of the gear 70 whereby balanced power loads can be transmitted, in equal proportions, through the gear trains GT to the ultimately driven gear section 51.

The intermediate trains of gears referred to are alike in function, construction and operation and one of such trains will now be described in detail.

Starting with the ultimately driven internal gear section 51 the train will be followed back to the floating pinion gear 70 which is provided for driving these trains. At the outset it will be pointed out that there is an idler gear bearing which is provided by a vertically extending pin or stationary shaft 90, a first intermediate gear set bearing provided by a vertically extending pin or shaft 91, and a second intermediate gear set bearing provided by a pin or shaft 92.

The shaft or pin 90 is relatively stationarily positioned, and the lower end 93 thereof enters the bored opening 94 in the lower base portion of the stationary frame member 23. The upper end 95 of the pin 90 is held against horizontal movement by a bored section 96 of the main frame, to wit, by a section which is vertically spaced above the bored section 94, whereby a receiving space is provided for an idler gear 97 arranged so that the teeth thereof mesh with the tooth section 51 of the ultimately driven rotatable turntable element 50. This pin 90 is held against vertical displacement by means of the screw 98 and retention plate 99.

A first intermediate gear set is provided by an associated lower pinion or small gear 100 and an upper large gear 101 keyed thereto at 102. The pinion 100 meshes with the idler gear 97, and it is to be noted that the lower portion of the tooth section 51 of the ultimately driven main turntable element 50, the lower portion of the idler gear 97 and the lower portion of the pinion gear 100, all extend into the main oil pocket 64 whereby constant lubrication thereof is maintained.

The bearing pin or shaft 91 is relatively fixedly secured and the lower end thereof extends into a bored opening of the main frame member 23, while the upper end thereof is secured in place and held against horizontal movement by the cover LC and the parts carried thereby. A lubricant can be supplied thereto from the exterior of the stationary casing through the medium of an oil cup provided at 105 and the oil passageways 106 leading to the anti-friction bearings provided at the upper and lower interior extremities of the gear 100.

The second intermediate gear set which is revolvably mounted on the bearing that includes the pin 92, comprises a lower pinion or small gear 103 and a larger gear 104 which is keyed thereto at 111. The lower pinion or small gear 103 meshes with the large gear 101 of the first set. The large gear 104 of the second set meshes with the floating pinion or gear element 70 heretofore mentioned. It is to be noted that the large gear 101 of the first intermediate set and the small pinion or gear 103 of the second intermediate set constantly dip into the intermediately positioned oil pocket 84 whereby these two gears just mentioned are essentially constantly lubricated. It will also be noted that the gear 104 and the pinion 70 constantly dip into the upper oil pocket 83 whereby these gears are essentially lubricated as the apparatus functions.

Access openings are provided in the removable cover RC at 107. These access openings are normally covered by the readily reached covers 108.

The second intermediate gear set has an oil cup 109 and oil passageways 110 leading therefrom to the upper anti-friction bearing that is within the pinion gear 103. The shaft 92 is relatively fixedly supported in place by being forced into a tight bored section of the main frame member 23. The idler gear 97 is shown with anti-friction bearings and each of the sets of idler gears has anti-friction bearings. The lowermost of these anti-friction bearings dips in the oil pockets described. The oiling devices 105 and 109 are provided so as to permit ready oiling of the uppermost anti-friction bearings which, it will be manifest, are necessarily above the pockets containing the lubricant.

A shield 112 is provided to cover the space between the upper fixed portion of the frame member 23 and the annular gear section 51 whereby dust, moisture or the like is prevented from entering the space occupied by the several gears herein described. Said shield, or guard as it may be called, is retained in place by bolts 113, and it is to be noted that suitable packing 114 is provided between an upwardly extending flange portion 115 of the shield 112 on the one hand, and the adjacent portion of the carrying structure on the other hand. A felt packing may be provided as at 116 in the upper edge portion of the internal annular gear section 51 to complete the dust and weather-proof tightness between said gear section 51 and the underside of the shield 112.

The overflow 63 may be used solely as an overflow to determine the height of the oil within the system at the time of filling, and if used for that purpose it could be covered by a blanking plate which would in effect form a closure thereof. On the other hand, if desired, this overflow 63 could be provided with a pipe extending therefrom to the exterior, and such pipe might be the return pipe of a continuous oil supply system.

An opening for draining the oil is provided at 117. This opening is normally closed by a screw plug 118.

From what has preceded it will be manifest that the operative mechanism as a whole, to wit, from the motor end on the one hand to the ultimately driven rotatable element 50 of the turntable construction on the other hand, including the stationary parts constituting the motor casing, the gear casings and the stationary portion of the turntable construction, is embodied in an arrangement or assemblage which protects the operative mechanical elements or movable members thereof from detrimental effects of the weather, dust or the like, and that certain of the parts are essentially self-lubricating thereby requiring a minimum degree of attention, and that any such parts as might require a certain degree of periodic attention are readily accessible from the exterior of the casing.

I claim:

1. In a sedimentation unit, in combination, a sedimentation basin having a receiving section for solids collected and transferred thereto and a discharge leading therefrom through which liquid-solids mixture containing the solids passed to said solids receiving section is passed from said basin, a pier that extends upwardly from the bottom of said basin, a solids raking and collecting assemblage that derives support from said pier, a motor, and associated speed reducing and power transmission mechanism for imparting to said solids raking and collecting mechanism turning movement about a vertically extending axis whereby, incident to said turning movement, solids are collected from diverse sections of the bottom of the sedimentation basin and are thereby ultimately passed to and into said solids receiving section; which unit is characterized in that the pier is hollow to provide a chamber open at the top; in that the unit comprises a turntable construction of which there is stationarily mounted upon said pier a turntable main frame constituting a base member, and of which there is a movable turntable member that is mounted upon said stationary turntable main frame member so as to turn about a vertically extending axis and which constitutes means by which the solids raking and conveying assemblage derives support from said pier; in that said stationary and movable turntable members each have access openings of sufficient size to permit an attendant to pass therethrough to and from the chamber within said pier; and in that said motor and speed reducing and power transmission mechanism derive support from said pier.

2. In mechanism for use in connection with means for holding a liquid-solids mixture, a housing providing a stationary bearing section, a horizontally turnable solids raking assemblage mounted on said bearing section and having a bull gear through which the turning forces are imparted to said assemblage, motivating means carried by said housing, a load equalizing gear element actuated by said motivating means and bodily movable to adapt itself to load requirements hereinafter referred to, and two sets of power transmission gear means each driven by and from said equalizing gear element and each providing a gear in driving engagement with the bull gear, which equalizing gear element is arranged so that due to a bodily movement and consequent adjustment thereof it will apply the same power load to and through each of said sets of power transmission gears.

3. In apparatus having means for holding a liquid-solids mixture, in combination, a stationary pier having a stationary bearing member thereupon; a solids raking assemblage having a horizontally turnable bearing member carried by said stationary bearing member, a horizontally turnable bull gear concentric with said turnable bearing member, and a rake carrying frame extending downwardly from said turnable bearing member; motivating means; and power transmission mechanism which derives support from said pier; which mechanism is driven from said motivating means and comprises a load equalizing gear element and a plurality of power transmission gear trains; each of which gear trains has an intermediate gear driven by said equalizing gear element and arranged so that part of the load from the equalizing gear element is transmitted through one of said gear trains to one portion of the horizontally turnable bull gear and so that part of the load from the equalizing gear element is transmitted through another of said gear trains to a diametrically opposite portion of the horizontally turnable bull gear; said equalizing gear element being sufficiently floatable so that said transmission gear trains will receive equal and inter-balanced load portions.

4. In apparatus having means for holding a liquid-solids mixture, in combination, a stationary pier, a solids raking assemblage, having a horizontally turnable bearing member carried by said pier and also comprising a horizontally turnable main driven gear, motivating means, a power transmission mechanism which derives support from said pier, which mechanism is driven from said motivating means and comprises a vacillatory gear, and power transmission gear trains, each of which gear trains has a horizontally turnable intermediate gear driven by said vacillatory gear and arranged so that one part of the load from the vacillatory gear is transmitted through one of said gear trains to one portion of the horizontally turnable main driven gear and so that another part of the load from the vacillatory gear is transmitted through another of said gear trains to another portion of the horizontally turnable main driven gear, said vacillatory gear having sufficient movement in a horizontal direction so that it becomes automatically positioned whereby the load transmitted thereby to and through said gear trains will be equally divided between said gear trains.

5. A construction as defined in and by claim 3 according to which the power transmission mechanism is composed of a section having a relatively light-duty fast-moving gear train terminating in and providing the equalizing gear element, and a plurality of sections each providing a relatively heavy-duty slow-moving gear train that includes an intermediate gear driven by the equalizing gear element and also a final gear that engages and drives a section of the horizontally turnable bull gear; and according to which the motivating means and the section having the light-duty fast-moving gear train are embodied in and by a construction that provides for sufficient float movement of the equalizing gear for the latter to adapt itself whereby it will impart equal driving power loads to each of the heavy-duty slow-moving gear trains and therethrough ultimately to the horizontally turnable bull gear.

CHARLES H. SCOTT.